US010894518B2

(12) United States Patent
Masuda et al.

(10) Patent No.: US 10,894,518 B2
(45) Date of Patent: Jan. 19, 2021

(54) DOOR TRIM

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Tomonari Masuda, Aichi-ken (JP); Mitsuaki Eshima, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 7 days.

(21) Appl. No.: 16/388,395

(22) Filed: Apr. 18, 2019

(65) Prior Publication Data

US 2019/0344729 A1 Nov. 14, 2019

(30) Foreign Application Priority Data

May 11, 2018 (JP) ................................ 2018-092255

(51) Int. Cl.
*B60R 13/02* (2006.01)
*B60J 5/04* (2006.01)
*B60R 21/04* (2006.01)

(52) U.S. Cl.
CPC ......... *B60R 13/0243* (2013.01); *B60J 5/0413* (2013.01); *B60R 21/0428* (2013.01); *B60R 2013/0293* (2013.01)

(58) Field of Classification Search
CPC ........... B60R 13/0243; B60R 13/0206; B60R 21/0428; B60J 5/0413

(Continued)

(56) References Cited

U.S. PATENT DOCUMENTS 9,457,735 B2 10/2016 Migaki
9,505,356 B2 11/2016 Migaki
(Continued)

FOREIGN PATENT DOCUMENTS

FR 2971308 8/2012
JP H10-100681 4/1998
(Continued)

OTHER PUBLICATIONS

Extended European Search Report in counterpart Application No. 19170760.3, dated Jun. 27, 2019.

(Continued)

*Primary Examiner* — Jason S Morrow
(74) *Attorney, Agent, or Firm* — Greenblum & Bernstein, P.L.C.

(57) ABSTRACT

A door trim installed in a vehicle includes an upper board and a lower board. The upper board includes a mounting boss. The lower board includes a body and a mounting flange. The body defines a lower portion of the door trim. The mounting flange extends upward from an upper edge of the body and includes a mounting hole. The mounting flange is disposed behind a back face of the upper board. The mounting boss protrudes from the back face of the upper board toward the mounting hole of the mounting flange. The mounting hole includes a through hole portion and a slot portion. The mounting boss is inserted in the through hole portion. The slot portion extends from a front section of a hole edge of the through hole portion toward a front of the vehicle to communicate with the through hole portion.

7 Claims, 6 Drawing Sheets

(58) Field of Classification Search
USPC ...................................................... 296/146.7
See application file for complete search history.

(56) References Cited

U.S. PATENT DOCUMENTS

| | | | |
|---|---|---|---|
| 9,994,165 B1 * | 6/2018 | Barrera Torres | B60R 13/0243 |
| 2001/0025456 A1 * | 10/2001 | Furuyama | B60R 13/02 |
| | | | 49/502 |
| 2010/0146862 A1 * | 6/2010 | Lin | B60J 5/0468 |
| | | | 49/502 |
| 2013/0033066 A1 * | 2/2013 | Tanizawa | B60R 13/0243 |
| | | | 296/146.7 |
| 2015/0375692 A1 | 12/2015 | Migaki | |
| 2016/0001714 A1 | 1/2016 | Migaki | |
| 2019/0039533 A1 * | 2/2019 | Shioda | F16B 5/0657 |
| 2019/0389104 A1 * | 12/2019 | Heikkila | B29C 45/1418 |

FOREIGN PATENT DOCUMENTS

| | | |
|---|---|---|
| JP | 2002-046521 | 2/2002 |
| JP | 2006-007998 | 1/2006 |

OTHER PUBLICATIONS

Japanese Office Action in counterpart Japanese Application No. JP2018-092255, dated Feb. 27, 2020 (along with English-language translation thereof).

\* cited by examiner

DOOR TRIM

CROSS REFERENCE TO RELATED APPLICATION

This application claims priority from Japanese Patent Application No. 2018-092255 filed on May 11, 2018. The entire contents of the priority application are incorporated herein by reference.

TECHNICAL FIELD

The technology described herein relates to a door trim.

BACKGROUND

A known door trim includes an upper board and a lower board. The upper board and the lower board define an upper portion and a lower portion of the door trim, respectively. The upper board and the lower board include overlapping portions that overlap each other. The overlapping portions of the upper board and the lower board are fixed to each other. The lower board includes a projecting portion that projects upward. The projecting portion is disposed opposite the upper board and fixed to the upper board.

In a side collision of a vehicle that includes the door trim described above, an external force may be applied to only one of the upper board and the lower board from an outer side. Because the upper board and the lower board are fixed together, the other one of the upper board and the lower board may also deform toward the inner side of the vehicle. Furthermore, because the upper board and the lower board are fixed together, deformation of the upper board and the lower board may be small. Therefore, an impact in the side collision may not be properly absorbed.

SUMMARY

The technology described herein was made in view of the foregoing circumstances. An object is to improve protection of an occupant of a vehicle from contacting a door trim during a side collision of a vehicle and to more properly absorb an impact of the side collision to improve collision safety.

A door trim installed in a vehicle includes an upper board and a lower board. The upper board defines an upper portion of the door trim and includes a mounting boss. The lower board includes a body and a mounting flange. The body defines a lower portion of the door trim. The mounting flange extends upward from an upper edge of the body and includes a mounting hole. The mounting flange is disposed behind a back face of the upper board. The mounting boss protrudes from the back face of the upper board toward the mounting hole of the mounting flange. The mounting hole includes a through hole portion and a slot portion. The mounting boss is inserted in the through hole portion. The slot portion extends from a front section of a hole edge of the through hole portion toward a front of the vehicle to communicate with the through hole portion.

When an external force is applied to the upper board in a side collision, the external force may not be applied to the mounting flange because the mounting flange is fixed to the mounting flange that extends upward from the upper edge of the body of the lower board in an end portion of the upper board closer to the front or the rear of the vehicle. The upper board deforms toward the interior of the vehicle relative to the lower board. The mounting boss slides into the slot portion and thus the end portion of the upper board can move relative to the mounting flange of the lower board. Namely, the upper board can move relative to the lower board. This allows the upper board to deform and thus the impact in the side collision is effectively absorbed. Furthermore, the lower board is less likely to deform when the upper board deforms. Therefore, an occupant of the vehicle is less likely to contact the lower board.

According to the technology described herein, the door trim is less likely to contact the occupant of the vehicle in the side collision and the impact in the side collision can be effectively absorbed. Therefore, the side collision safety improves.

DETAILED DESCRIPTION

An embodiment will be described in detail with reference to the drawings. The technology described herein is not limited to the embodiment below. Modifications and improvement may be added to the embodiment.

Figure 1:
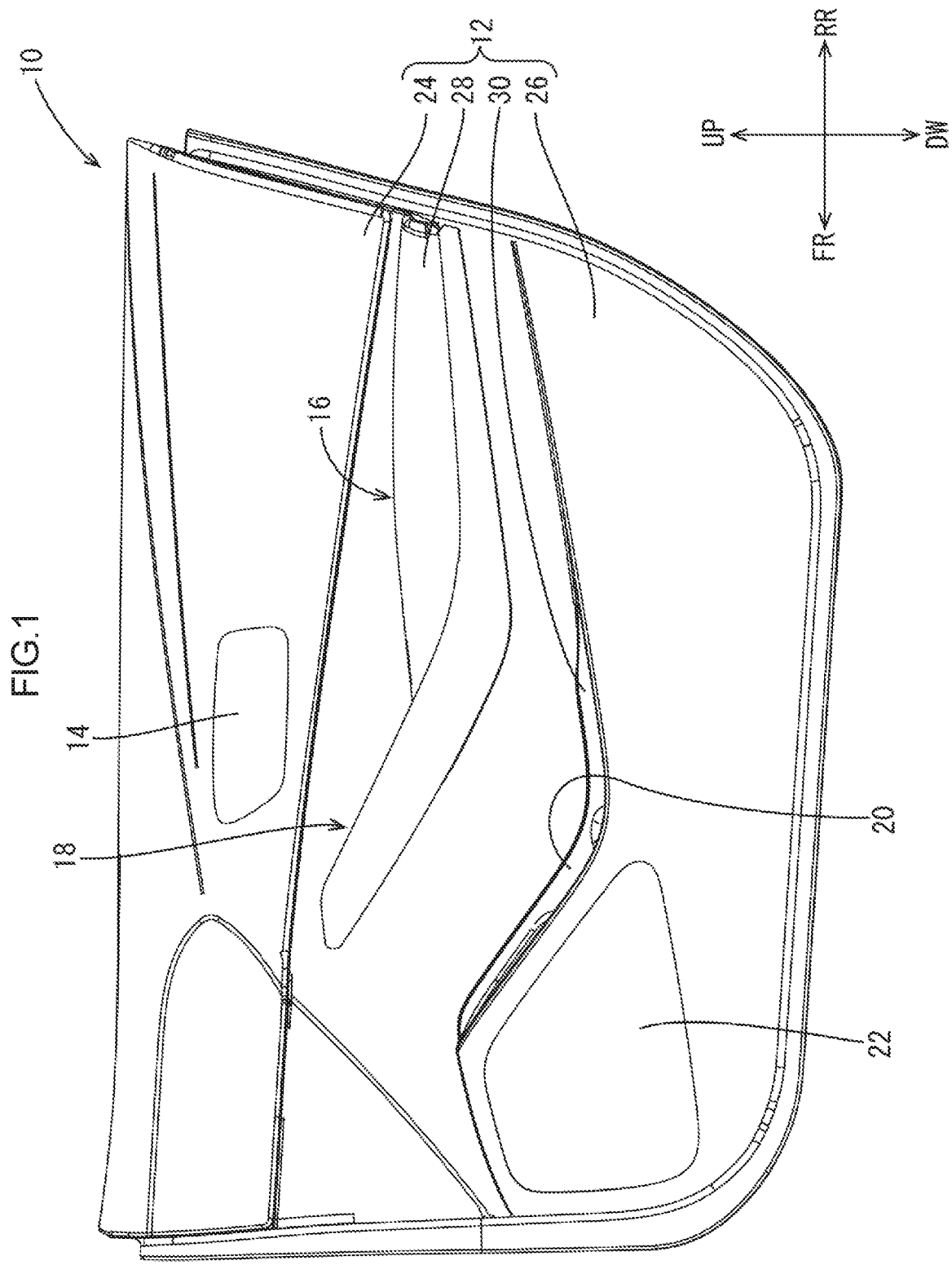
FIG. 1 is an elevated view of a front side of a door trim according to an embodiment.
Figure 2:
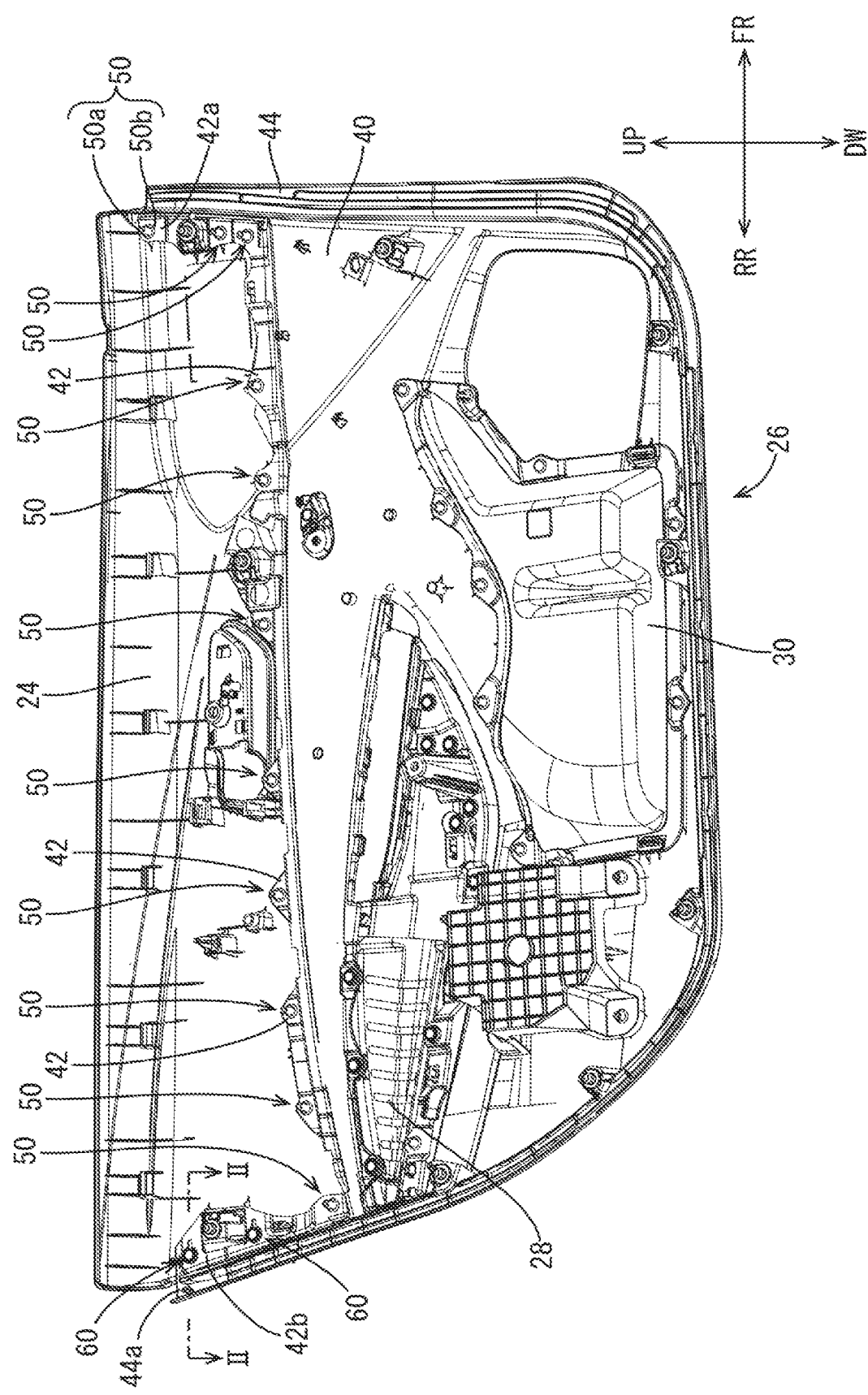
FIG. 2 is an elevated view of the back side of the door trim.
Figure 3:
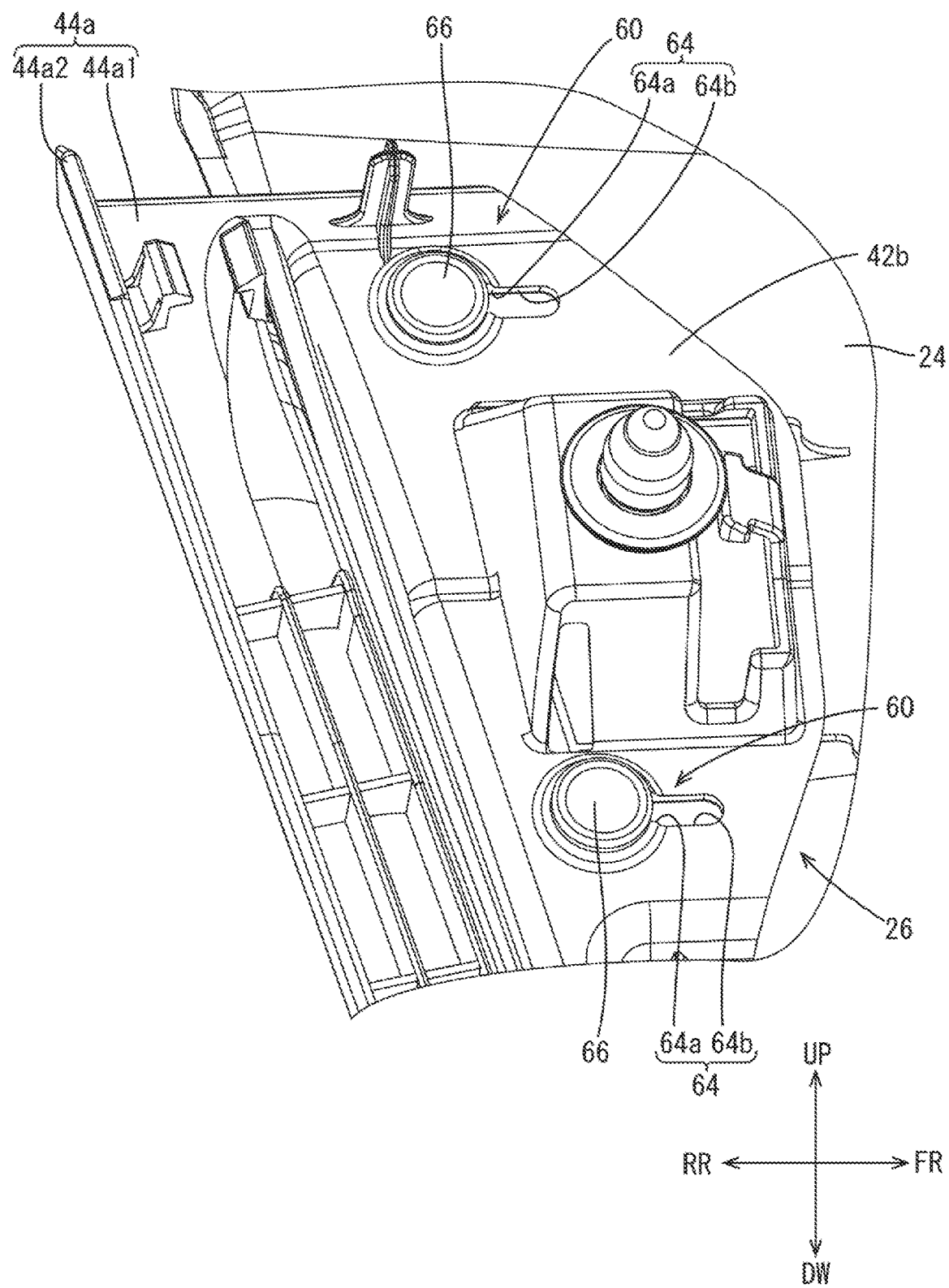
FIG. 3 is a magnified view of a fastening structure on the back side of the door trim for fastening an upper board to a lower board.
Figure 4:
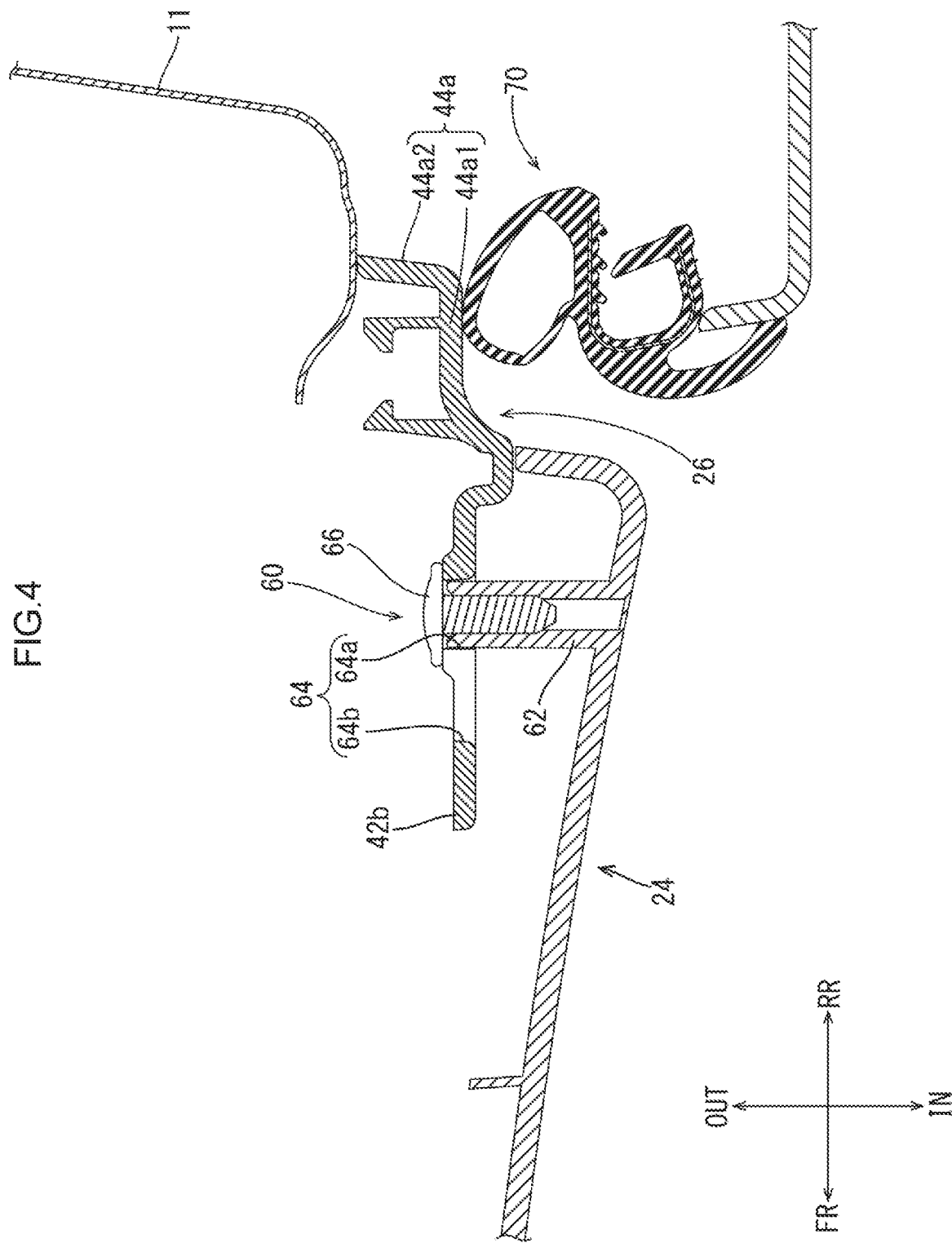
FIG. 4 is a cross-sectional view of the fastening structure.

A door trim 10 according to the embodiment is fixed to a door inner panel 11 of a vehicle in which the door trim 10 is installed. The door inner panel 11 and a pillar 70 of the vehicle are illustrated in FIG. 4 that illustrates a cross section of a portion of FIG. 2. In FIG. 2, the door inner panel 11 and the pillar 70 are not illustrated for a clear view of the backside of the door trim 10. In the drawings, FR, RR, UP, DW, IN, and OUT pointed by arrows indicate the front, the rear, the upper side, the lower side, the interior, and the exterior of the vehicle, respectively. The door trim 10 is a component of a side door of a vehicle. The door trim 10 is fixed to the door inner panel 11 (see FIG. 4) from an interior of the vehicle to form an interior portion of the side door. The door trim 10 includes functional components including a trim board 12, an inside handle 14, an armrest 16, a door grip 18, a door pocket 20, and a speaker grille 22. The trim board 12 includes an upper board 24, a lower board 26, an armrest board 28, and a door pocket board 30. The inside handle 14 is formed in the upper board 24. The upper board 24 forms an upper portion of the door trim 10 and the lower board 26 forms a lower portion of the door trim 10. The armrest board 28 is fixed to an upper portion of the front face of the lower board 26 at about the middle of the trim board 12 to define the armrest 16. As illustrated in FIG. 2, the door pocket board 30 is fixed to a lower portion of the back face of the lower board 26 to define the door pocket 20. The inside handle 14 is disposed on the upper board 24. The door grip 18 is disposed on the lower board 26 at a location between the front edge of the lower board 26 and the armrest 16. The speaker grille 22 is disposed in a lower front portion of the lower board 26.

The upper board 24 and the lower board 26 are fixed together. A fastening structure of the upper board 24 and the lower board 26 will be described in detail with reference to FIGS. 2 to 5.

The upper board 24 and the lower board 26 are substantially rectangular boards having long dimensions in the front-rear direction of the vehicle. The upper board 24 includes first mounting bosses 50a (a front mounting boss) and second mounting bosses 62 (a rear mounting boss). The lower board 26 includes a body 40, mounting flanges 42, and an edge portion 44. The body 40 defines a lower portion of the door trim 10 and includes a decorative surface on the interior of the vehicle. The body 40 includes an upper edge that is substantially linear in the front-rear direction of the vehicle and a peripheral edge that is curved along an outline of a lower portion of the side door. The mounting flanges 42 extend upward from the upper edge of the body 40. The edge portion 44 extends from the peripheral edge of the body 40 and edges of the mounting flanges 42 as illustrated in FIG. 2. The mounting flanges 42 are fixed to the first mounting bosses 50a and the second mounting bosses 62. As a result, the upper board 24 and the lower board 26 are fixed together.

As illustrated in FIG. 2, the mounting flanges 42 include a front mounting flange 42a, a rear mounting flange 42b, and middle mounting flanges 42c. The front mounting flange 42a extends upward from a front end of the upper edge of the body 40. The rear mounting flange 42b extends upward from a rear end of the upper edge. The middle mounting flanges 42c extend upward from the middle section of the upper edge between the front end and the rear end. Heights of the front mounting flange 42a and the rear mounting flange 42b are greater than heights of the middle flanges 42c.

The edge portion 44 includes a rear edge portion 44a including a section that is disposed behind the pillar 70. The rear edge portion 44a extends from the rear edge of the rear mounting flange 42b to a space between the door inner panel 11 and the pillar 70. As illustrated in FIG. 4, the rear edge portion 44a includes a first rear edge section 44a1 and a second rear edge section 44a2. The first rear edge section 44a1 extends from the rear edge of the rear mounting flange 42b toward the rear of the vehicle. The second rear edge section 44a2 extends from a distal end of the first rear edge section 44a1 toward the door inner panel 11. The first rear edge section 44a1 contacts the pillar 70. The front mounting flange 42a, the rear mounting flange 42b, and the middle mounting flanges 42c are opposed to the back face of the upper board 24; however, the edge portion 44 is not opposed to the back face of the upper board 24.

The fastening structure includes first fastening structures 50 and second fastening structures 60. The first fastening structures 50 include the first mounting bosses 50a, the front mounting flange 42a, and the middle mounting flanges 42c to fasten a front portion and a lower portion of the upper board 24 to the lower board 26. The front mounting flange 42a and the middle mounting flanges 42c include first mounting holes 50b (a through hole of the first mounting flange), respectively. Each of the first mounting holes 50b a through hole having a hole edge without a break. The first mounting bosses 50a are fitted in the respective first mounting holes 50b and distal ends of the first mounting bosses 50a are deformed through heating and locked to hole edges of the respective first mounting holes 50b. Namely, the first fastening structures 50 uses heat staking for fastening.

The second fastening structures 60 include the second mounting bosses 62, the rear mounting flange 42b, and screws 66 to fasten a rear portion of the upper board 24 to the lower board 26. The rear mounting flange 42b includes second mounting holes 64 (a mounting hole of the rear mounting flange) that are through holes located at positions corresponding to the second mounting bosses 62. The second mounting holes 64 include through hole portions 64a and slot portions 64b. Each through hole portion 64a has a round shape with an inner diameter slightly larger than an outer diameter of the corresponding second mounting boss 62. Each slot portion 64b has an elongated shape that extends from a front section of a hole edge of the through hole portion 64a toward the front of the vehicle to communicate with the corresponding through hole portion 64a. The dimension of each slot portion 64b measuring in the vertical direction of the vehicle is smaller than an outer diameter of the corresponding through hole portion 64a.

Figure 5:
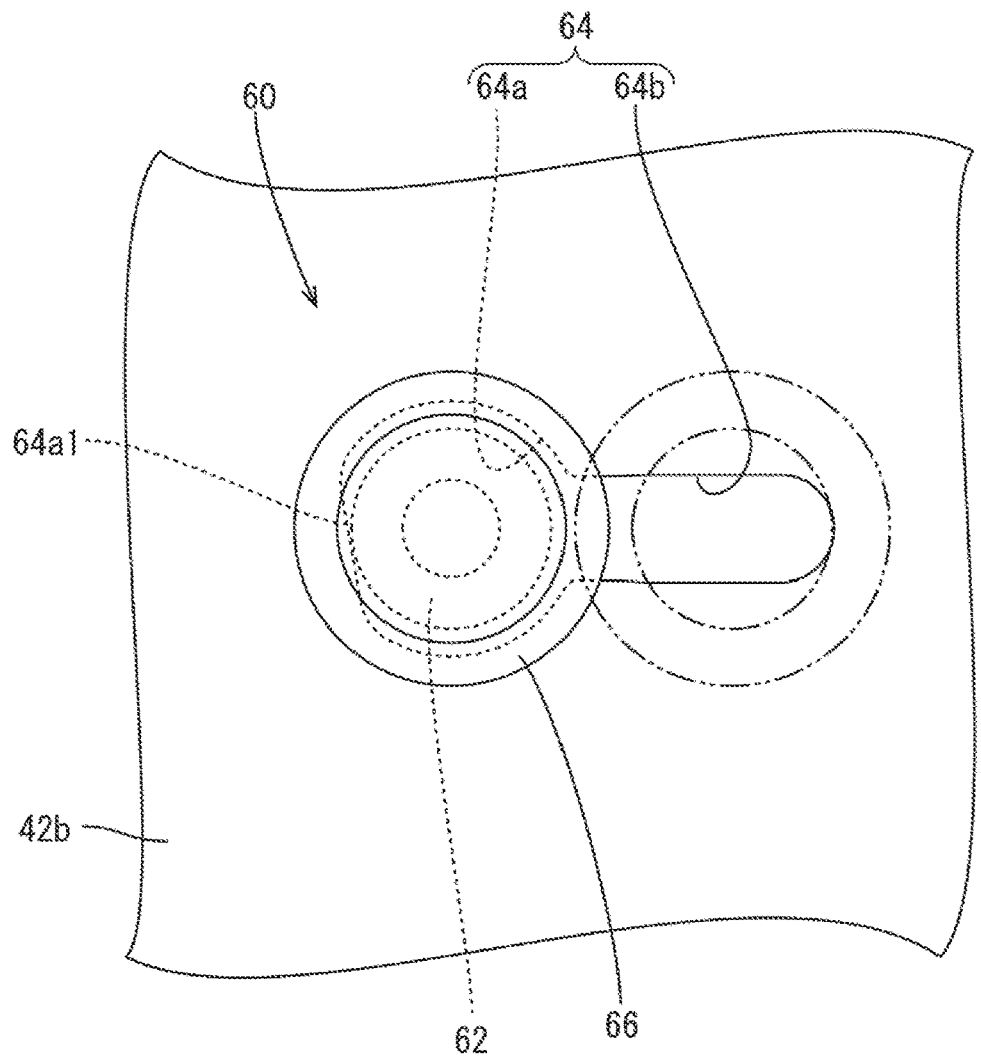
FIG. 5 is a magnified back view of the fastening structure.
Figure 5:
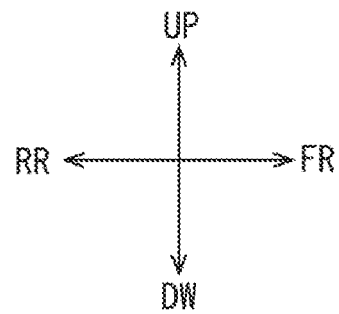

As illustrated in FIG. 5, the hole edge of each through hole portion 64a includes a linear section 64a1 on an opposite side from the slot portion 64b (i.e., the center of the through hole portion 64a is located between the linear section 64a1 and the slot portion 64b). The linear section 64a1 contacts the corresponding second mounting boss 62. With the linear section 64a1 in contact with the second mounting boss 62, a position of the second mounting boss 62 within the through hole portion 64a is defined. The dimension of each slot portion 64b is smaller than an outer diameter of the corresponding second mounting boss 62. Each second mounting boss 62 has a round pipe shape having a hollow in the middle with an opening at a distal end. The screws 66 are screwed into the second mounting bosses 62, respectively. As illustrated in FIG. 4, the second mounting bosses 62 are fasten to the rear mounting flange 42b with the rear edge of the upper board 24 in contact with the rear mounting flange 42b and the screws 66 screwed into the second mounting bosses 62 that are in the through hole portions 64a of the second mounting holes 64. Each of the screws 66 includes a shank and a head. The shank is inserted in the hollow of the corresponding second mounting boss 62. The head is held against at least a section of the hole edge of the corresponding through hole portion 64a on an opposite side from the slot portion 64b. The section of the hole edge includes the linear section 64a1.

Figure 6:
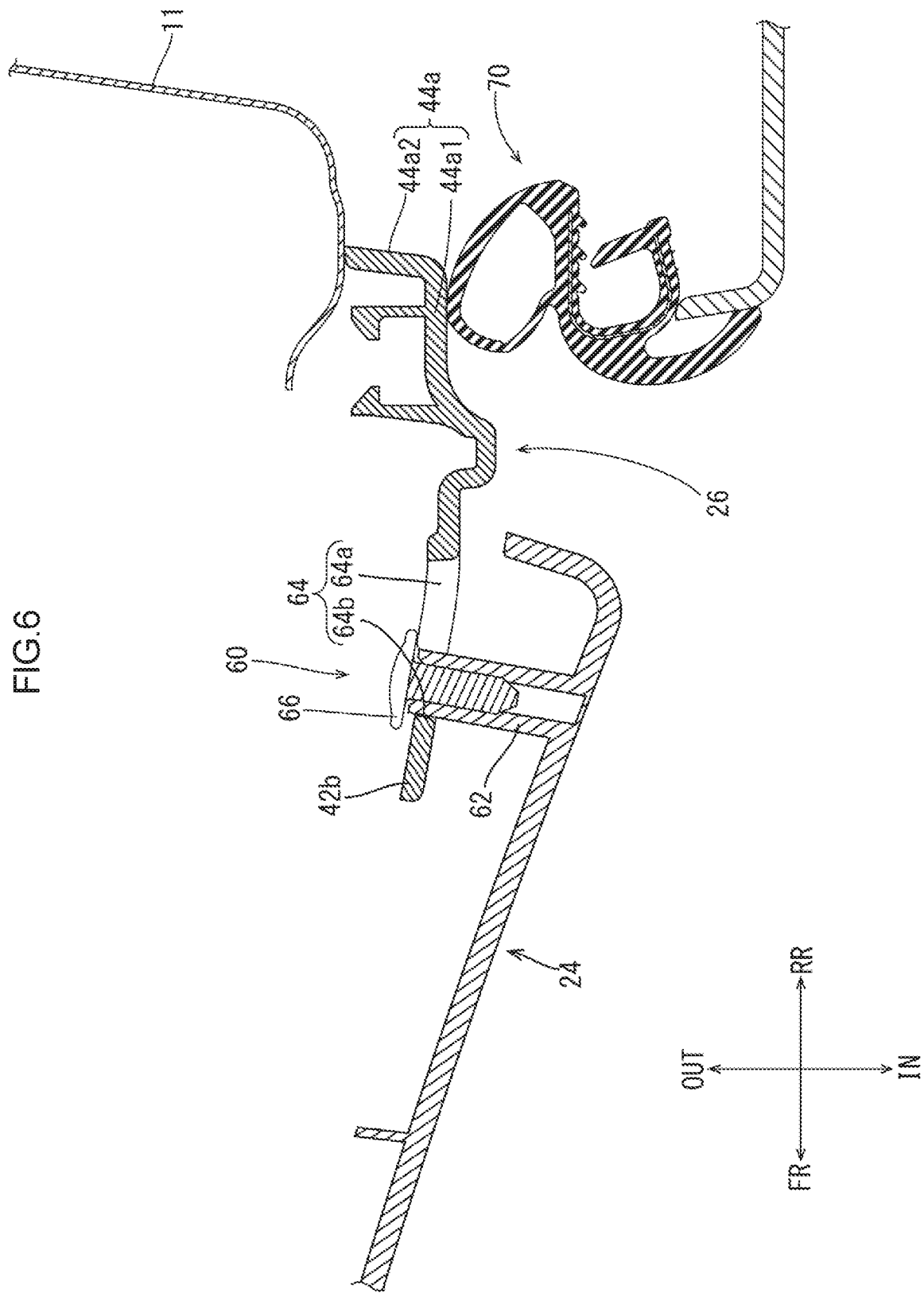
FIG. 6 is a magnified cross-sectional view of the fastening structure in a side collision.

How the state of the fastening structure changes in a side collision will be described in detail. If the side door of the vehicle is impacted by another vehicle, the side door deforms toward the interior of the vehicle and the upper board 24 may deform as illustrated in FIG. 6. The rear edge portion 44a of the lower board 26 contacts the pillar 70. Therefore, a rear portion of the lower board 26 including the rear edge portion 44a is less likely to deform toward the interior of the vehicle.

If the second fastening structures 60 do not include the slot portions 64b, the rear mounting flanges 42b is fixed to the second mounting bosses 62. Namely, the upper board 24 is tightly fixed to the lower board 26 and thus the upper board 24 is less likely to deform or the second mounting bosses 62 are broken resulting in removal of the upper board 24 from the lower board 26 in a side collision. In either case, a sufficient level of shock absorption may not be achieved.

In this embodiment, the second fastening structures 60 include the slot portions 64b, which allow a rear portion of the upper board 24 to slide toward the front of the vehicle relative to the lower board 26. When the upper board 24 is deformed in an side collision, the second mounting bosses 62 in the respective through hole portions 64a slide into the respective slot portions 64b, resulting in sliding of the rear portion of the upper board 24 toward the front of the vehicle relative to the lower board 26. Namely, the slot portions 64b allow the deformation of the upper board 24 while the upper board 24 remains attached to the lower board 26. With the deformation of the upper board 24 and the sliding of the rear portion of the upper board 24, a proper level of the shock absorption can be achieved in the side collision. Furthermore, the second mounting bosses 62 are less likely to be broken in the side collision. Therefore, the rear portion of the upper board 24 is less likely to be removed from the lower board 26 and thus less likely to contact an occupant of the vehicle.

The second fastening structures 60 are provided only at the rear portion of the door trim 10. A front portion of the upper board 24 is farther from the occupant. Therefore, even if the first mounting bosses 50a are broken in the side collision and the front portion of the upper board 24 is removed from the lower board 26, the front portion of the upper board 24 is less likely to contact the occupant. With the first fastening structures 50 farther from the occupant and including the first mounting bosses 50a tightly fixed to the front mounting flange 42a and the middle mounting flanges 42c, complete removal of the upper board 24 from the lower board 26 is less likely to occur in the side collision. With the second fastening structures 60 closer to the occupant and including the second mounting holes 64 that allow the sliding the rear portion of the upper board 24 relative to the lower board 26 in the side collision, the proper level of shock absorption is provided. According to the configuration, side collision safety improves.

The following is a modification of the trim board 12 including second fastening structures that are different from the second fastening structures 60. The modification includes an upper board including mounting holes and a lower board including a rear mounting flange that is opposed to a front face of a rear portion of the upper board. The rear mounting flange includes mounting bosses. Each mounting hole includes a through hole portion and a slot portion that extends from a hole edge of the through hole toward the rear of the vehicle so that the rear portion of the upper board slides toward the front of the vehicle relative to the lower board.

Some of the first fastening structures 50 may be replaced with the second fastening structures 60.

The invention claimed is:

1. A door trim installed in a vehicle, the door trim comprising:
   an upper board defining an upper portion of the door trim and including a mounting boss; and
   a lower board including:
   a body defining a lower portion of the door trim; and
   a mounting flange extending upward from an upper edge of the body and including a mounting hole, wherein
   the mounting flange is disposed behind a back face of the upper board,
   the mounting boss protrudes from the back face of the upper board toward the mounting hole of the mounting flange,
   the mounting hole including:
   a through hole portion in which the mounting boss is inserted; and
   a slot portion extending from a front section of a hole edge of the through hole portion toward a front of the vehicle to communicate with the through hole portion, wherein
   the upper board includes a front portion closer to the front of the vehicle and a rear portion closer to a rear of the vehicle,
   the mounting flange is opposed to a back face of the rear portion of the upper board and defined as a rear mounting flange,
   the mounting boss is included in the rear portion of the upper board and defined as a rear mounting boss,
   the lower board further includes a rear edge portion extending from a rear edge of the rear mounting flange to a space between a pillar and a door inner panel of the vehicle,
   the lower board further includes a front mounting flange opposed to the front portion of the upper board and including a through hole having a hole edge without a break, and
   the front portion of the upper board includes a front mounting boss protruding from the back face toward the through hole of the front mounting flange and fitted in the through hole.

2. The door trim according to claim 1, wherein the slot portion has a dimension measuring in the vertical direction of the vehicle smaller than a dimension of the mounting boss measuring in the vertical direction of the vehicle.

3. The door trim according to claim 1, wherein the lower board further includes the rear edge portion disposed closer to the rear of the vehicle than the mounting flange so that at least a section of the rear edge portion is disposed behind a pillar of the vehicle.

4. The door trim according to claim 1, wherein the lower board further includes the rear edge portion extending from a rear edge of the rear mounting flange and including a section disposed behind a pillar of the vehicle.

5. The door trim according to claim 1, wherein the front mounting boss includes a distal end that is deformed and locked to the hole edge of the through hole of the front mounting flange.

6. The door trim according to claim 1, further comprising a screw, wherein
   the rear mounting boss includes a hollow in the middle with an opening at a distal end of the rear mounting boss,
   the screw includes a shank and a head,
   the shank is inserted in the hollow of the rear mounting boss, and
   the head is held against at least a section of a hole edge of the through hole portion on an opposite side from the slot portion.

7. The door trim according to claim 6, wherein
   the hole edge of the through hole portion includes a linear section on the opposite side from the slot portion,
   the rear mounting boss contacts the linear section, and
   the linear section of the hole edge is included in the section of the hole edge against which the head is held.

* * * * *